(12) United States Patent
Anderson et al.

(10) Patent No.: US 10,908,363 B2
(45) Date of Patent: Feb. 2, 2021

(54) SELECTIVE UV CURING OF EPOXY ADJACENT TO OPTICAL FIBERS BY TRANSMITTING UV ENERGY THROUGH THE FIBER CLADDING

(71) Applicant: CommScope, Inc. of North Carolina, Hickory, NC (US)

(72) Inventors: Timothy W. Anderson, Omaha, NE (US); Jeffrey D. Nielson, Longmont, CO (US)

(73) Assignee: CommScope, Inc. of North Carolina, Hickory, NC (US)

( * ) Notice: Subject to any disclaimer, the term of this patent is extended or adjusted under 35 U.S.C. 154(b) by 593 days.

(21) Appl. No.: 15/582,595

(22) Filed: Apr. 28, 2017

(65) Prior Publication Data

US 2017/0235059 A1    Aug. 17, 2017

Related U.S. Application Data

(63) Continuation of application No. 14/149,949, filed on Jan. 8, 2014, now Pat. No. 9,664,863.
(Continued)

(51) Int. Cl.
*G02B 6/36* (2006.01)
*G02B 6/38* (2006.01)
(Continued)

(52) U.S. Cl.
CPC ........ *G02B 6/3696* (2013.01); *B29D 11/0074* (2013.01); *G02B 6/02042* (2013.01);
(Continued)

(58) Field of Classification Search
CPC .. G02B 6/3696; G02B 6/3843; G02B 6/3861; G02B 6/3885; G02B 6/3882; G02B 6/02042; B29D 11/0074
See application file for complete search history.

(56) References Cited

U.S. PATENT DOCUMENTS

| 4,000,416 A | * | 12/1976 | Goell | G02B 6/02042 |
| | | | | 385/123 |
| 4,962,996 A | * | 10/1990 | Cuellar | C03C 25/106 |
| | | | | 385/128 |
| 5,107,535 A | * | 4/1992 | Hakogi | G02B 6/30 |
| | | | | 359/900 |

(Continued)

FOREIGN PATENT DOCUMENTS

| GB | 2166975 A | 5/1986 |
| JP | 62-023009 A | 1/1987 |

(Continued)

*Primary Examiner* — Mathieu D Vargot
(74) *Attorney, Agent, or Firm* — Muncy, Geissler, Olds & Lowe, P.C.

(57) ABSTRACT

A method and system for affixing multi-core fiber (MCF) within a ferrule includes a UV light source and a light guide. MCFs are placed into epoxy filled holders, e.g., channels or v-grooves, of a ferrule. A first MCF in a first holder is clocked to orient its cores to a desired position. The light source is activated, and the light from the light guide is launched into an outer layer of the first MCF, like the cladding layer or a dedicated light carrying layer. The light in the outer layer will stay in the outer layer until it reaches the portion of the first MCF in contact with the epoxy, even if the light is launched from the far end of the fiber remote from the holder. At the holder, the light will leak out due to the similarity in the index of refraction. The leaking light will at least partially cure the epoxy to affix the first MCF within the first holder. The process may then be repeated for the remaining MCFs, so that each MCF may be clocked and affixed selectively rather than collectively.

17 Claims, 12 Drawing Sheets

Related U.S. Application Data

(60) Provisional application No. 61/750,019, filed on Jan. 8, 2013.

(51) Int. Cl.
  *B29D 11/00* (2006.01)
  *G02B 6/02* (2006.01)

(52) U.S. Cl.
  CPC ......... *G02B 6/3843* (2013.01); *G02B 6/3861* (2013.01); *G02B 6/3882* (2013.01); *G02B 6/3885* (2013.01)

(56) References Cited

U.S. PATENT DOCUMENTS

| | | |
|---|---|---|
| 5,677,973 A | 10/1997 | Yuhara et al. |
| 5,734,773 A | 3/1998 | Teshima et al. |
| 6,154,594 A | 11/2000 | Fiacco et al. |
| 6,243,518 B1 | 6/2001 | Lee et al. |
| 6,550,980 B2 | 4/2003 | Schofield et al. |
| 6,850,681 B2 | 2/2005 | Lepont et al. |
| 7,046,904 B2 | 5/2006 | Chang et al. |
| 7,548,674 B1 | 6/2009 | Horibe et al. |
| 8,529,138 B2 | 9/2013 | Duis et al. |
| 2004/0189321 A1 | 9/2004 | Drexler et al. |
| 2010/0124398 A1 | 5/2010 | Murphy et al. |
| 2011/0229085 A1 | 9/2011 | Bradley et al. |
| 2011/0229086 A1 | 9/2011 | Bradley et al. |
| 2011/0274398 A1 | 11/2011 | Fini et al. |
| 2012/0219254 A1 | 8/2012 | Bradley et al. |
| 2013/0163072 A1 | 6/2013 | Chang et al. |
| 2013/0228707 A1 | 9/2013 | Nieminen |
| 2013/0251320 A1 | 9/2013 | Hayashi |

FOREIGN PATENT DOCUMENTS

| | | |
|---|---|---|
| JP | 09-096737 A | 4/1997 |
| JP | 2012-002882 A | 1/2012 |
| KR | 10-2000-0050765 A | 8/2000 |

* cited by examiner

SELECTIVE UV CURING OF EPOXY ADJACENT TO OPTICAL FIBERS BY TRANSMITTING UV ENERGY THROUGH THE FIBER CLADDING

This application is a continuation of application Ser. No. 14/149,949, filed Jan. 8, 2014, now U.S. Pat. No. 9,664,863, which claims the benefit of U.S. Provisional Application No. 61/750,019, filed Jan. 8, 2013. The entire contents of the two prior applications are herein incorporated by reference.

BACKGROUND OF THE INVENTION

1. Field of the Invention

The present invention relates to optical fiber and hardware for connectorizing an optical fiber end. More particularly, the present invention relates to a system and method for clocking and affixing one or more multi-core fibers within a connector ferrule using light curable epoxy.

2. Description of the Related Art

Optical network operators are continuing to look for ways to obtain increased density of optical fiber networks. One method for packaging higher numbers of light carrying paths in a small space is Multi Core Fiber ("MCF"). A MCF typically comprises a central core surrounded by several satellite cores in a radial pattern surrounding the central core. Each of the cores is potentially a light carrying path, and the MCF thus provides multiple parallel paths for optical signal transmission and/or reception in a single fiber.

A MCF is known in the existing art. See for example, U.S. Pat. Nos. 5,734,773 and 6,154,594 and U.S. Published Applications 2011/0229085, 2011/0229086 and 2011/0274398, each of which is herein incorporated by reference. In the background art of U.S. Published Application 2011/0274398, as depicted in FIGS. 1 and 2, a MCF 180 has a central core 181 and multiple satellite cores 182, e.g., six satellite cores 182-1, 182-2, 182-3, 182-4, 182-5 and 182-6, in a common cladding layer 184. The satellite cores 182 are positioned around the central core 181 symmetrically, at the vertices of a regular hexagon 183.

Each of the central and satellite cores 181 and 182 exhibits a same diameter. The central core 181 and each of the satellite cores 182 has a diameter of about 26 micrometers (um), depicted as distance A in FIG. 2. A center to center spacing relative to the adjacent satellite cores 182 is about 39 um, depicted as distance B in FIG. 2. Other dimensions and spacing, besides those shown in U.S. Published Application 2011/0274398, as depicted in FIGS. 1 and 2, are known in the background art. Also, more or fewer satellite cores 182 are known in the background art.

Each of the central and satellite cores 181 and 182 may carry a unique light signal, and each MCF 180 is affixed within a channel of a ferrule of a connector for communicating its unique signals of the central and satellite cores 181 and 182 to a device via a port, or to further cabling via an adapter. FIG. 3 depicts a typical connector 201 having a cylindrical ferrule 203 presenting an end of a single MCF 180 for mating to another connector, via an adapter, or for communicating with a port of a device. FIG. 4 depicts an MT-type ferrule 303 having first and second holes 305 and 307 for accepting alignment pins of a matting ferrule. Between the first and second holes 305 and 307, the MT-type ferrule 303 presents an array of twelve fiber ends of MCFs 180-1 through 180-12 for communicating to MCFs of the matting ferrule. The fiber ends are between v-grooves in the ferrule 303 and a plate 308 attached to the ferrule 303. An access window 309 opens to the MCFs 180-1 through 180-12 residing the v-grooves and can be used to flood epoxy into the v-grooves, as is conventional in the art. Although it is known in the prior art to attach the plate 308 to the ferrule 303, as shown in U.S. Pat. Nos. 6,550,980 and 8,529,138, both of which are herein incorporated by reference, it is most common in the prior art for the structure above the v-grooves (e.g., represented by the plate 308 in FIG. 4) to be an integral portion of the ferrule 303. For example, US Patent Application Publication 2004/0189321, which is herein incorporated by reference, shows a typical MT ferrule wherein the structure above the fibers is an integral part of the ferrule and the v-grooves are replaced by circular channels. Hereinafter, the term holders is broad enough to encompass all structures holding a fiber, such as circular channels and v-grooves, and the ferrule is not limited to ferrules formed of two pieces, but also includes ferrules formed of a single piece. For example, reference numeral 308 refers to either a plate residing above the holders, e.g., v-grooves or channels of the ferrule, or a portion of the ferrule 303 residing above the holders.

Although FIG. 3 shows an LC type connector 201 and FIG. 4 shows a MT ferrule 303, which could be used in a MPO/MTP type connector, other connector styles for presenting a single MCF or multiple MCFs in an ordered array are known in the existing arts, such as ST, SC and MT-RJ. Further the row of MCFs presented by the ferrule 303 may include more or fewer MCFs, such as eight or sixteen MCFs in one or two or more rows.

Traditional optical fiber has a single central core along its axis. Mating two connectors requires precision alignment of the central axial cores between terminated fiber optic connectors to provide acceptable loss performance characteristics. With MCF 180, there are multiple satellite cores 182-X in addition to the central core 181 that also require lateral and axial alignment. Each of the cores 181 and 182-X in an MCF 180 must be aligned with a corresponding core in another MCF or port to which it will be connected. The "clocking" or rotation angle of the end face of one MCF 180 relative to another MCF 180 must therefore also be taken into account when a connection is made. Specifically, it would be beneficial to control the angular position of individual MCFs in a connector, such as an LC, SC, ST, MTRJ, MTP or MPO connector, so that the cores of each MCF are aligned and properly clocked with respect to the cores of a fiber at a mating connector/port. Hereinafter, the term connector will also encompass a device port.

MPO, MTP and MTRJ array type connectors align a plurality of fibers ends on one connector's termination face with a corresponding plurality of fibers ends on another connector's termination face. In these array type connectors, fiber alignment is handled by mating a pair of precision alignment pins in one array type connector with corresponding holes in the other array type connector, such as holes 305 and 307 depicted in FIG. 4. When the pins are inserted into the holes, the central axis of each individual fiber end of one connector is aligned with the central axis of each individual fiber end of the other connector. However, the alignment pins and holes of these connectors do not control for the axial rotational position of each MCF in the array because the array type connectors were designed for single core fibers and this angular relationship is not critical when single core fibers are mated.

LC, SC and ST connectors align a single fiber end captured within a cylindrical ferrule 203 of a first connector to a single fiber end captured within in a cylindrical ferrule 203 of a second connector. Like the array type ferrule 303 of FIG. 4, the single fiber is bonded within the cylindrical ferrule 203 using epoxy. The cylindrical ferrule 203 of the first connector is aligned to the cylindrical ferrule 203 of the second connector using a sleeve with a circular inner surface to receive a cylindrical ferrule 203 at each end. Typically, the sleeve is captured within an adapter housing and serves to bring the first and second ferrules 203 into end-to-end abutting, axial alignment. However, the sleeve of the adapter and the cylindrical ferrules 203 also do not control for the axial rotation or "clocking" position of the fiber end held by the ferrule 203 because the single fiber type connectors were design for single core fibers and this angular relationship is not critical when single core fibers are used.

SUMMARY OF THE INVENTION

The Applicant has appreciated that if MCFs are to be used in the ferrule 203 or ferrule 303 depicted in FIGS. 3 and 4, respectively, one must provide the correct clocking of the MCFs 180 in ferrules 203 and 303. One method of installing the MCFs 180 into the MT-type ferrule 303 involves individually inserting each MCF 180-1 through 180-12 into its appropriate holder, e.g., channel or v-groove, within the ferrule 303. Epoxy is used to secure each MCF 180-1 through 180-12 into its channel. The epoxy may be applied to the MCF 180-1 through 180-12 prior to insertion, or after insertion, such as by a syringe, flooding or/and wicking process, often times using the access window 309. The epoxy is cured by the application of light and/or heat.

Prior to curing the epoxy, each of the MCFs 180-1 through 180-12 is clocked to its proper angular orientation. For example, ferrule 303 is clamped onto an inspection bench, and the end face of each MCF 180-1 through 180-12 is inspected using a scope or light meter fixed to the inspection bench. Reference marks on the inspection scope's reticle or intensity sensors of the light meter are evaluated and the MCF 180-1 is rotated or clocked within the channel until satellite core 182-1 is precisely located at the twelve o-clock position, as illustrated in FIGS. 1 and 2, or some other desired position. Once the end face of the MCF 180-1 is properly clocked, the technician clamps MCF 180-1 into position. The MCFs are clocked and clamped in order 180-1, 180-2, etc., until the final MCF 180-12 is clocked and clamped into position. Then, the epoxy is cured by the application of UV light and/or heat. The epoxy may have been added into the holders prior to insertion of the MCFs 180-1 through 180-12 or after the insertion of the MCFs 180-1 through 180-12. After curing the epoxy, the ends of the MCFs 180 may be cleaved and/or polished.

The Applicant has determined that improved termination methods are needed to handle MCF connectorization, particularly in the case of array type connectors. For array type connectors, it is often difficult to precisely clock and clamp several MCFs 180-X within the ferrule 303. Once the position of the final MCF end is properly clocked, the position of one of the previously clocked and clamped MCF fibers may have slipped or slightly moved. As the satellite cores 182 have a very small diameter A, even a slight shift in the clocking will create a devastating attenuation in the connection of the satellite cores 182 from the first connector to the satellite cores 182 of the mated, second connector. Also, if even one of the MCF 180-X is only slightly out of clocked alignment, the entire connector is considered defective and must be recycled leading to wasted resources and efforts, as well as increased production costs.

It is an object of the present invention to address one or more of the drawbacks in the prior art, as appreciated by the Applicant.

Applicant has appreciated that it would be beneficial to position and clock the individual MCF fibers in a ferrule one at a time and then partially or fully cure the epoxy surrounding only that clocked fiber to hold it in a required angular position relative to the ferrule or connector housing before proceeding to the next MCF being held by the ferrule.

In attempting to follow this procedure, it has been found that dispensing epoxy one fiber at a time in a multi-fiber ferrule has proven to be difficult. In order to attach fibers individually, a very small drop of epoxy must be placed on an individual fiber without getting epoxy on any surrounding fibers in the multi-fiber array. It would be preferable to flood or semi-flood the fiber-to-ferrule bonding area and then selectively cure epoxy on individual fibers after they have been properly clocked or aligned.

These and other objectives are accomplished by a method and system for affixing multi-core fiber (MCF) within a ferrule, which includes a UV light source and a light guide. MCFs are placed into epoxy filled holders, e.g., channels or v-grooves, of a ferrule. A first MCF in a first holder is clocked to orient its cores to a desired position. The light source is activated, and the light from the light guide is launched into a cladding layer of the first MCF. The light in the cladding layer will stay in the cladding layer until it reaches the portion of the first MCF in contact with the epoxy, where the light will leak out due to the similarity in the index of refraction. The leaking light will at least partially cure the epoxy to affix the first MCF within the first holder. The process may then be repeated for the remaining MCFs, so that each MCF may be clocked and affixed selectively, rather than collectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
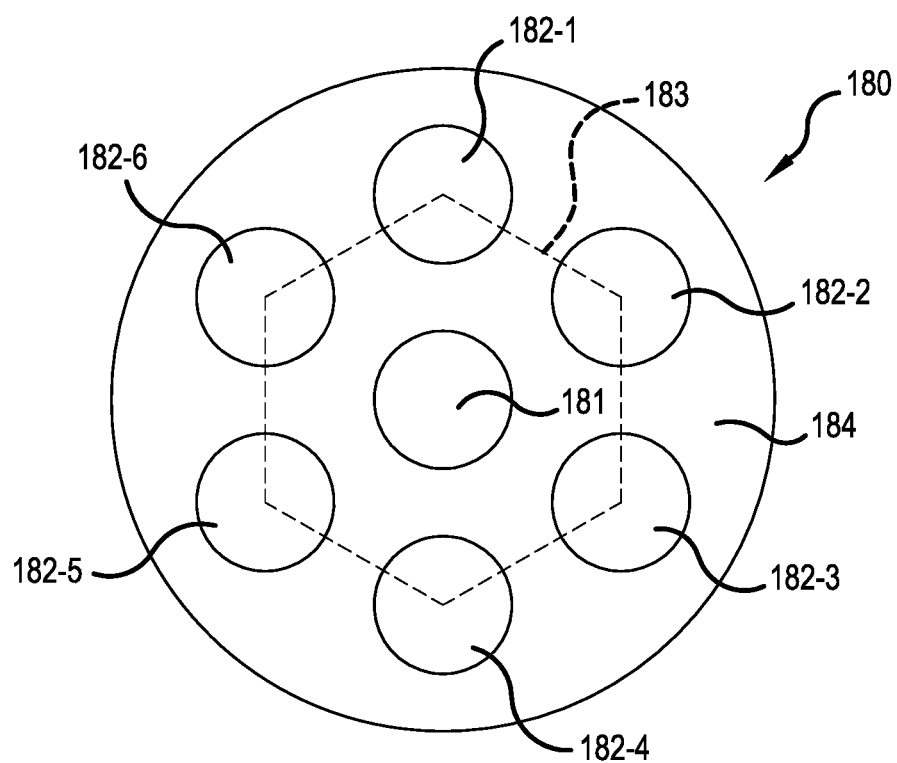
FIG. 1 is an end view of a multi-core optical fiber, in accordance with the prior art.
Figure 2:
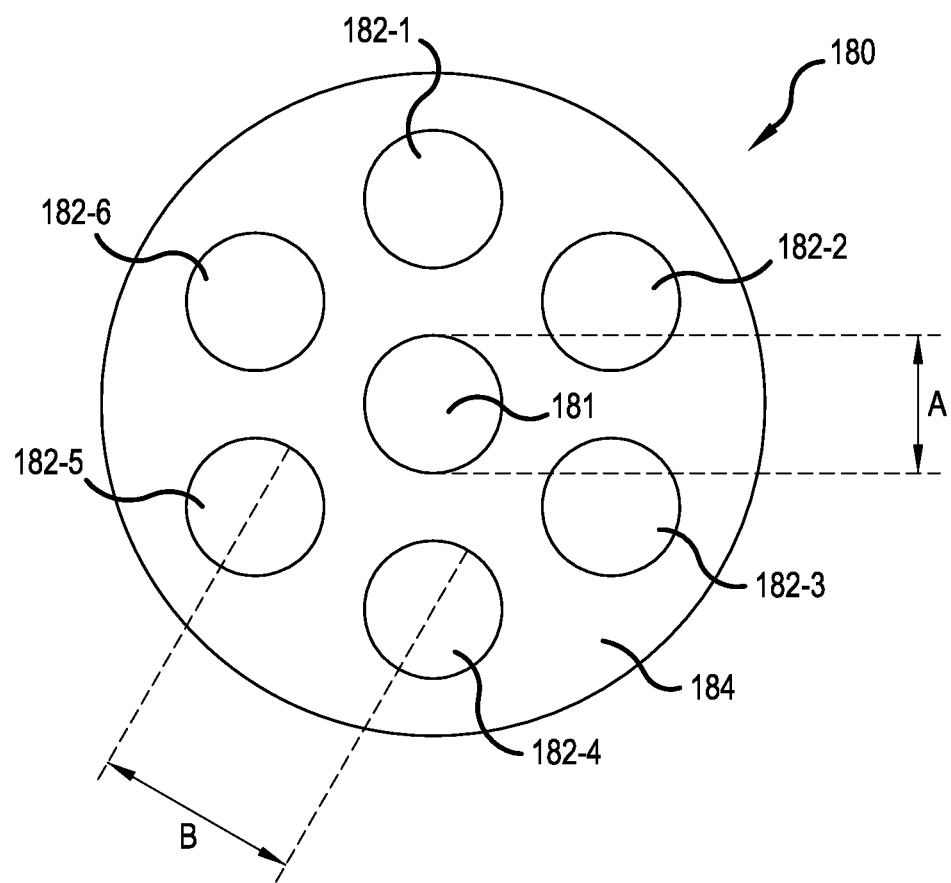
FIG. 2 is an end view of the multi-core optical fiber of FIG. 1, showing the dimension and spacings of the cores, in accordance with the prior art.
Figure 3:
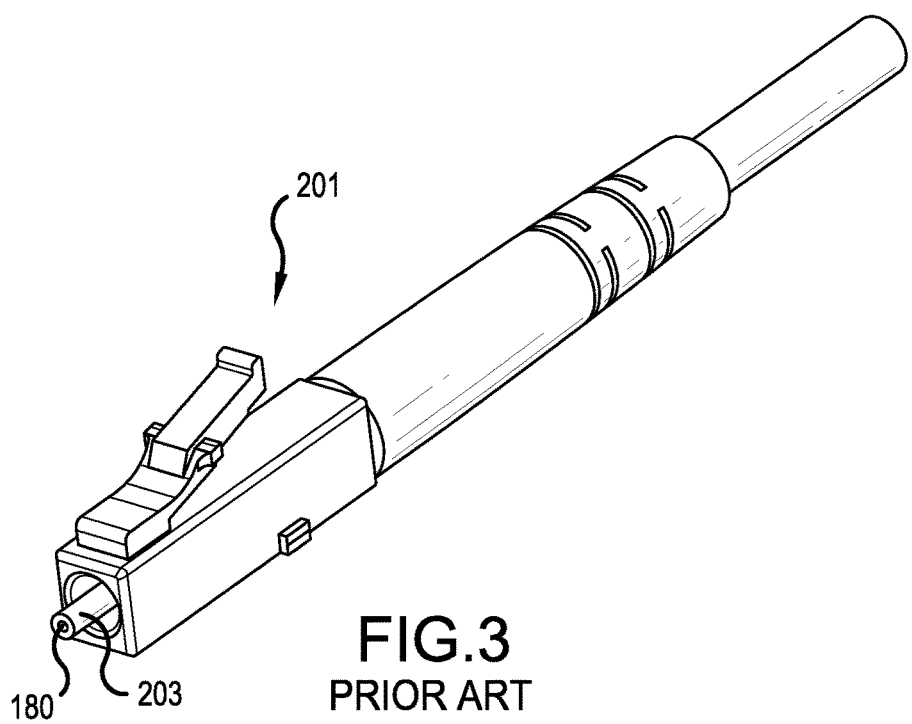
FIG. 3 is a perspective view of an LC fiber optic connector, in accordance with the prior art.
Figure 4:
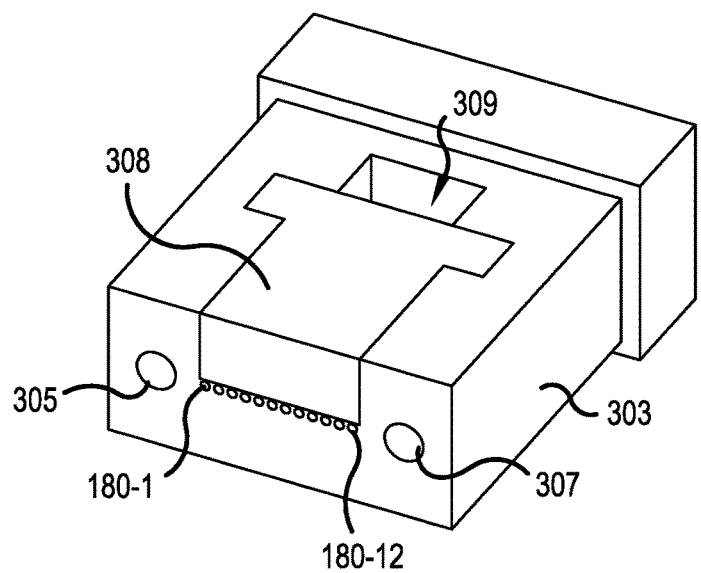
FIG. 4 is a perspective view of an MT ferrule for use in an MTP/MPO fiber optic connector, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 5:
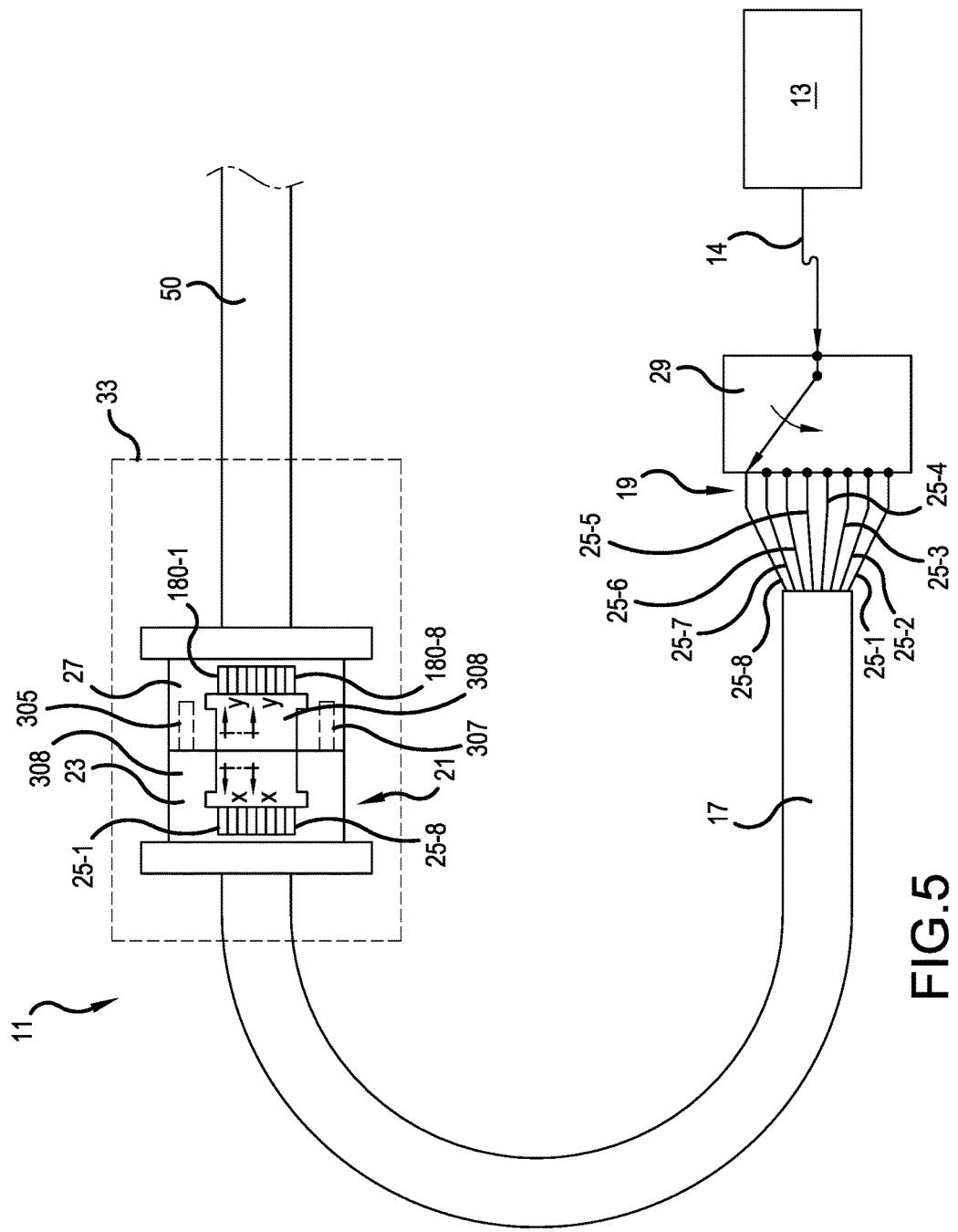
FIG. 5 is a block diagram, illustrating a machine for affixing MCF within a ferrule, in accordance with the present invention.

FIG. 5 is a block diagram, illustrating a machine 11 for affixing MCF, e.g., MCF 180-1, within a target ferrule 27, in accordance with the present invention. The machine 11 includes a light source 13 for generating a light wavelength, such as ultraviolet (UV) light, usable to cure light sensitive epoxy 15 (see FIG. 8). A light guide 17 has a first end 19 receiving light from the light source 13 and a second end 21 remote from the first end 19. The second end 21 of the light guide 17 supplies light to illuminate an outer layer, such as the cladding layer 184, of a target MCF 180-1, so that light leaks from the outer layer of the target MCF 180-1 into a light sensitive epoxy 15 in contact with the outer layer of the target MCF 180-1, as will be described in more detail in the method description below. A work station 33 includes fixtures for holding the ferrules, clamps for holding MCFs in clocked positions, and inspection scopes and/or light meters to precisely clock MCFs.

In one embodiment, the light guide 17 is formed by a fiber optic cable including plural source fibers 25-1 through 25-8 for transmitting light from the light source 13. A source ferrule 23, similar to ferrule 303 except for having guide pins instead of guide holes 305 and 307, is attached to the second end 21 of the light guide 17. The source ferrule 23 presents ends of the plural source fibers 25-1 through 25-8 to target MCFs 180-1 through 180-8 held in the target ferrule 27. Each of the source fibers 25-1 through 25-8 can launch light into the cladding layer 184 of a target MCFs 180-1 through 180-8, respectively.

A fiber optic switch 29 may be disposed between the light source 13 and the first end 19 of the light guide 17 by a light carrying link 14. The fiber optic switch 29 selectively connects the light of the light source 13 to a selected one of the source fibers 25-1, 25-2, 25-3, 25-4, 25-5, 25-6, 25-7 or 25-8, so that the respective end of the selected source fiber, as presented by the source ferrule 23, is illuminated to pass light into a single target MCF 180-1, 180-2, 180-3, 180-4, 180-5, 180-6, 180-7 or 180-8, respectively, of the target ferrule 27. The fiber optic switch 29 is optional, as a technician may manually shine the curing light emitted from light link 14 onto an end of a desired source fiber 25-1, 25-2, 25-3, 25-4, 25-5, 25-6, 25-7 or 25-8, or directly onto an end of a target MCF 180-1, 180-2, 180-3, 180-4, 180-5, 180-6, 180-7 or 180-8, hence entirely eliminating any need for the light guide 17.

A method, in accordance with an embodiment of the present invention, includes providing a fiber optic cable 50 with a first target optical fiber including at least one light carrying core 181 or 182-X for transmitting a communication signal and an outer layer, such as cladding layer 184, surrounding the at least one light carrying core 181 or 182-X. As shown in step S101 of FIG. 6, the first target optical fiber, such as MCF 180-1, is placed into a first holder 31-1, such as a channel or v-groove of the target ferrule 27. A second target optical fiber, such as MCF 180-2, is placed into a second holder 31-2 of the target ferrule 27, and so on until all of the target fibers, e.g., up to MCF 180-8, are installed into the holders, e.g., up to holder 31-8 of the target ferrule 27.

Figure 8:
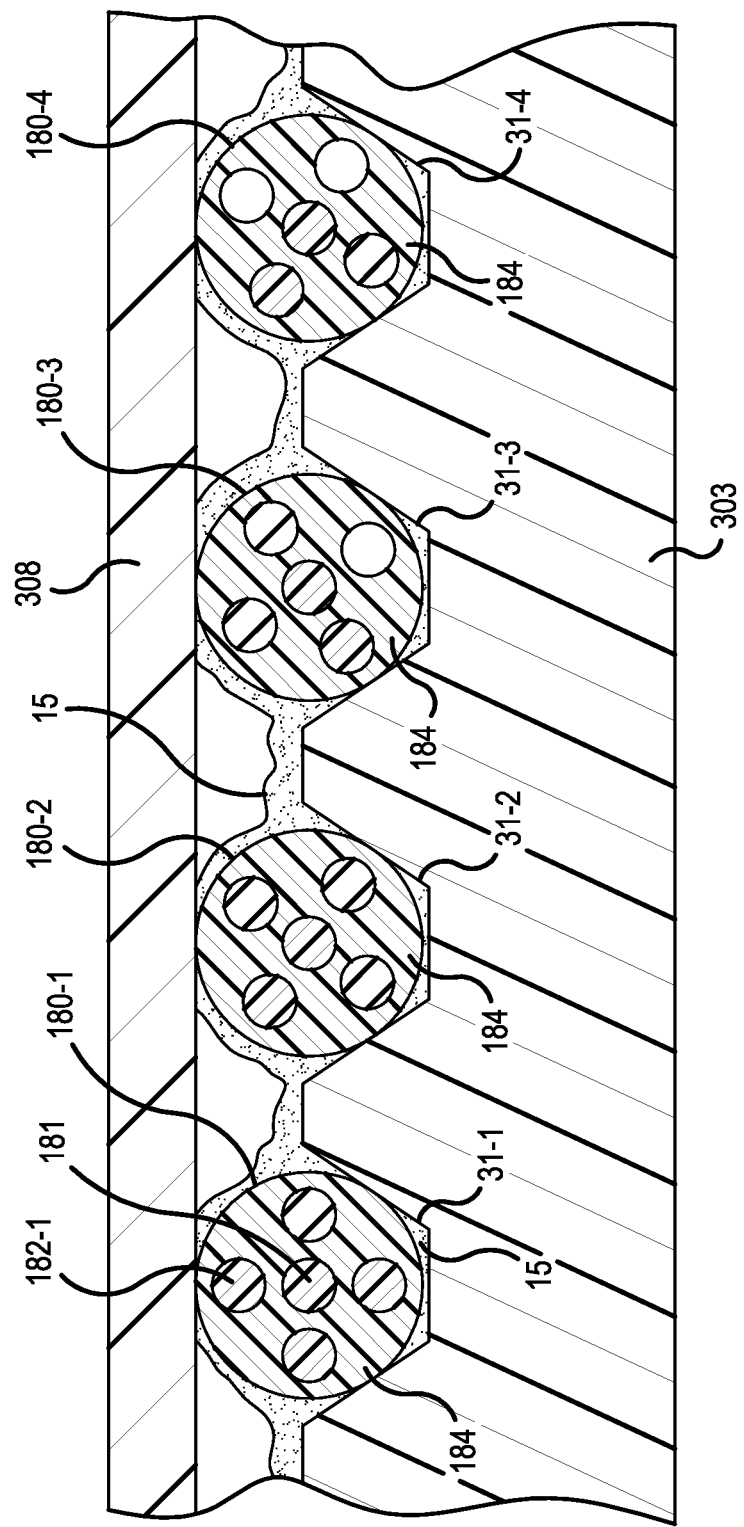
FIG. 8 is a cross sectional view of the target ferrule of FIG. 5 after an angular aligning step of a first target fiber.

Next, in step S103, light curable epoxy 15 is installed into the holders 31-1 through 31-8 and resides around at least a portion of each respective target optical fibers, e.g., MCFs 180-1 through 180-8. The epoxy 15 may have been applied to the holders prior to, or after, the target fibers 180-1 through 180-8 are placed into the holders 31-1 through 31-8, and may have been applied by flooding through access window 309. In other words, step S103 may precede step S101. The physical arrangement is depicted in FIG. 8, which is a cross sectional view taken along line Y-Y in FIG. 5 after step S103. Although FIGS. 8-10 illustrated four satellite cores 182 per MCF fiber 180, more or fewer satellite cores 182 may be included within MCF fiber 180.

Next, in step S105, the first MCF 180-1 is rotated within the holder 31-1 to place a satellite core 182-1 into a desired position. Next in step S107, the first MCF 180-1 is clamped into the desired position using a clamp. FIG. 8 is a cross sectional view of the target ferrule 27, taken along line Y-Y of FIG. 5, after the first target fiber 180-1 has been rotated and clamped into a position placing the first satellite core 182-1 in its desired position, e.g., after step S107.

Next, the source ferrule 23 is mated to the target ferrule 27 and the first source fiber 25-1 is selected by the fiber optic switch 29 and illuminated by the light source 13. FIG. 7 is a cross sectional view taken along line X-X in FIG. 5. As seen in FIG. 7, source fiber 25-1 includes a single central core 26-1, having a large diameter. The central core 26-1 is sufficient in diameter to launch illumination into the outer layer, e.g., the cladding layer 184, of the first target MCF 180-1, as defined flowchart step S109 of FIG. 6.

Figure 9:
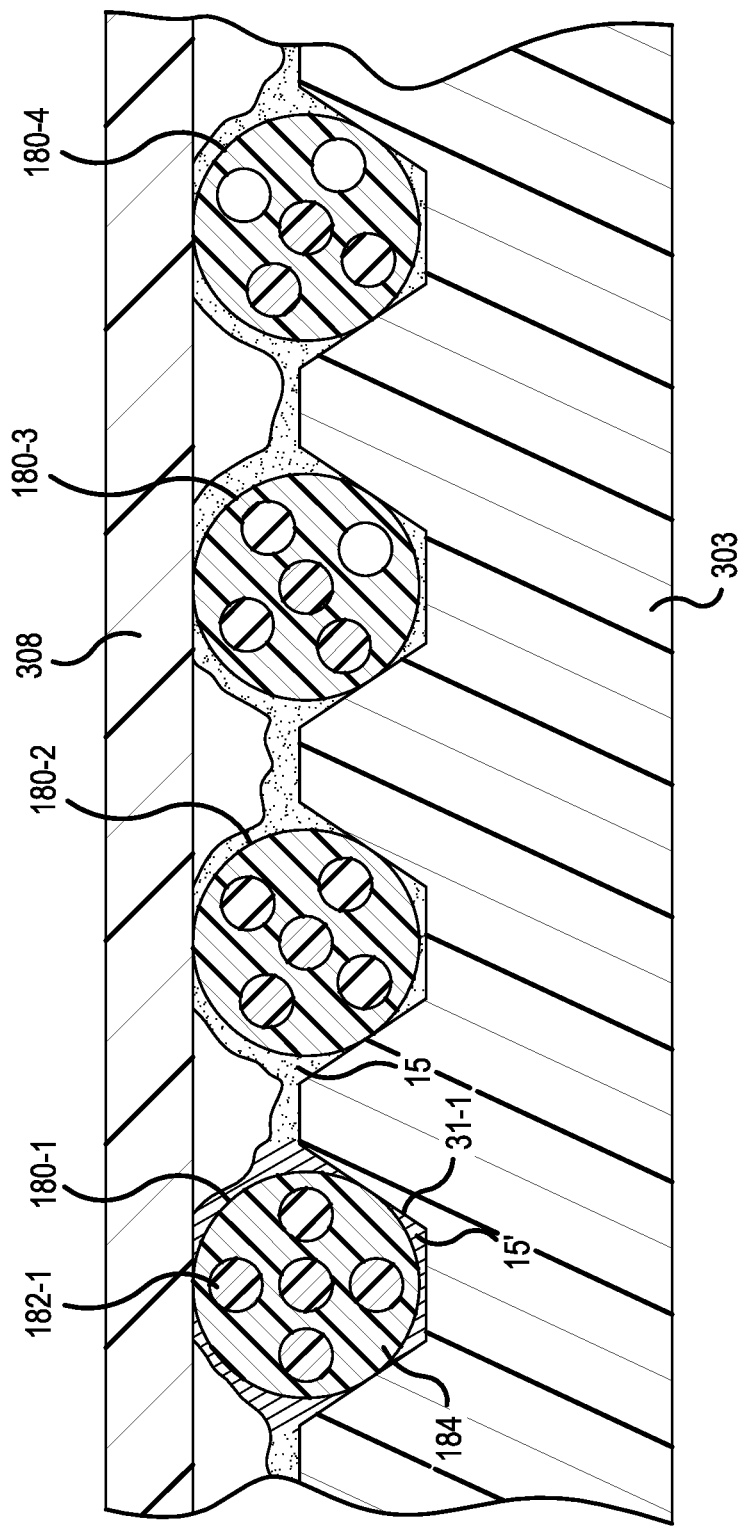
FIG. 9 is a cross sectional view of the target ferrule of FIG. 5 after a UV curing step of the first target fiber.
Figure 10:
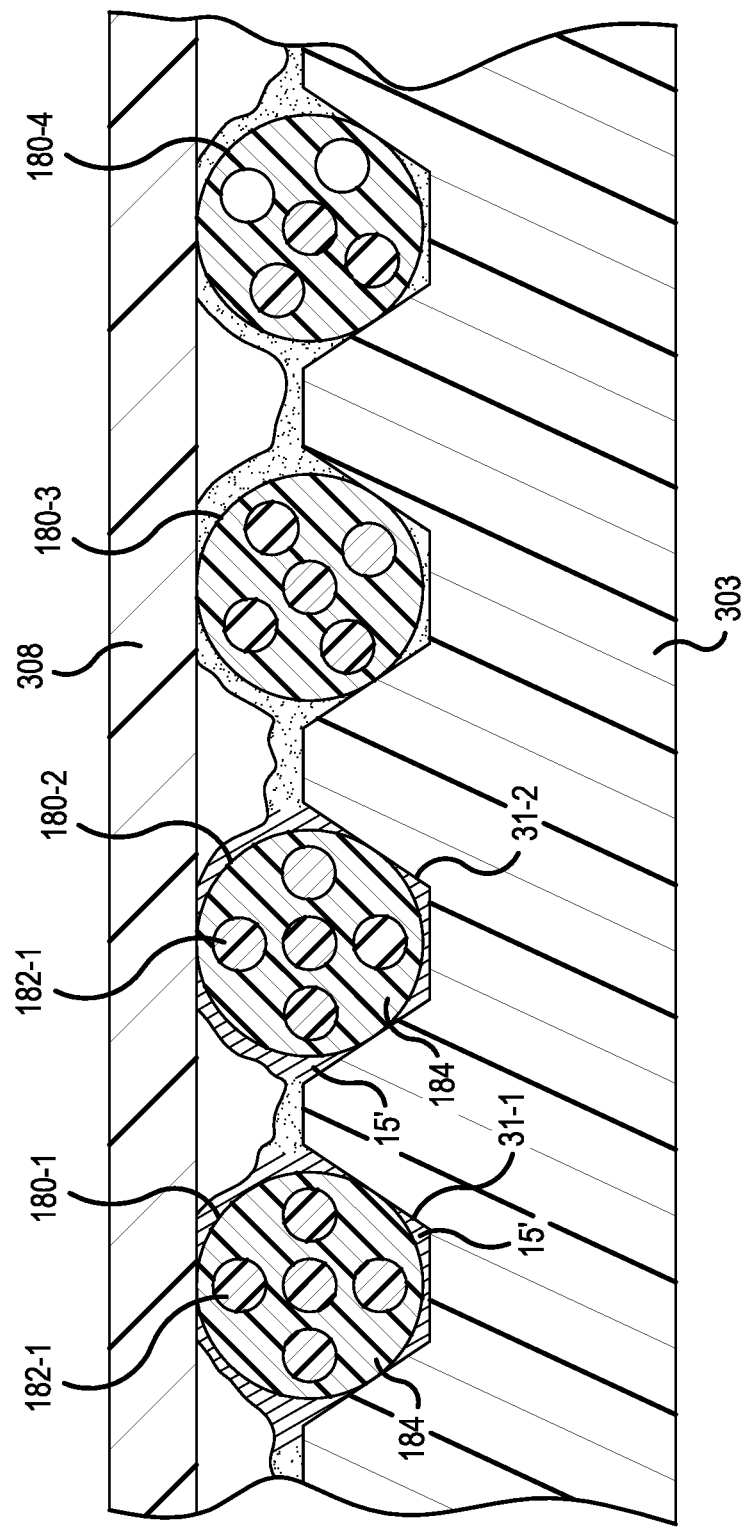
FIG. 10 is a cross sectional view of the target ferrule of FIG. 5 after an angular aligning step and UV curing step of a second target fiber.

FIG. 9 is a cross sectional view taken along line Y-Y in FIG. 5 after step S109. The light within the outer layer of the first target MCF 180-1 leaked outward into the light curable epoxy 15 and at least partially cured the light curable epoxy 15' in the first holder 31-1. Cured epoxy 15' has been illustrated by a cross hatching and by adding a prime (') to reference numeral 15. The extent or reach of the cured epoxy 15' is controlled so that the epoxy 15 touching the outer layer of the adjacent, or second target MCF 180-2, remains uncured. The extent of curing may be controlled by controlling either the intensity of the light output by light source 13, or the duration that light source 13 transmits the light, or both. Also, one could optionally control the launch angle of the curing light from the first source fiber 25-1 into outer layer, e.g., cladding layer 184, of the first target MCF 180-1, thereby controlling the angle of incidence of light travels within the outer layer to increase or decrease the level of light escaping from the outer layer of the first target MCF 180-1 dependent upon a steep angle or slight angle, respectively.

Next in step S111, steps S105 through S109 are repeated for the remaining target fibers, e.g., MCFs 180-2 through 180-8. Specifically, the second target MCF 180-2 is rotated and clamped within the second holder 31-2 to place its satellite cores into a desired position. Then, light is transmitted through the outer layer, e.g., cladding layer 184, of the second target MCF 180-2, so that light leaks outwardly and into the light curable epoxy 15 to at least partially cure the epoxy 15' in the second holder 31-2. FIG. 10 is a cross sectional view of the target ferrule 27, taken along line Y-Y of FIG. 5, after the second target fiber 180-2 has been clocked and clamped, and the adjacent epoxy 15' has been partially cured to hold the first satellite core 182-1 of the second target MCF 180-2 in its desired position. Again, it should be noted that the curing light used on the second target MCF 180-2 did not cure the epoxy 15 associated with the adjacent, third target MCF 180-3. It is also within the purview of the present invention, that a physical barrier may be added to the structure of ferrule 303 between the holders 31 to block curing light migrating from one holder 31-X to an adjacent holder 31-(X+1). The term "light curable epoxy," as used herein includes epoxy which can be cured by light and also includes epoxy which can be cured by light and heat. For instance, the curing light can be used to at least partially cure the epoxy, and a thorough curing can be accomplished by a final application of heat.

Figure 11:
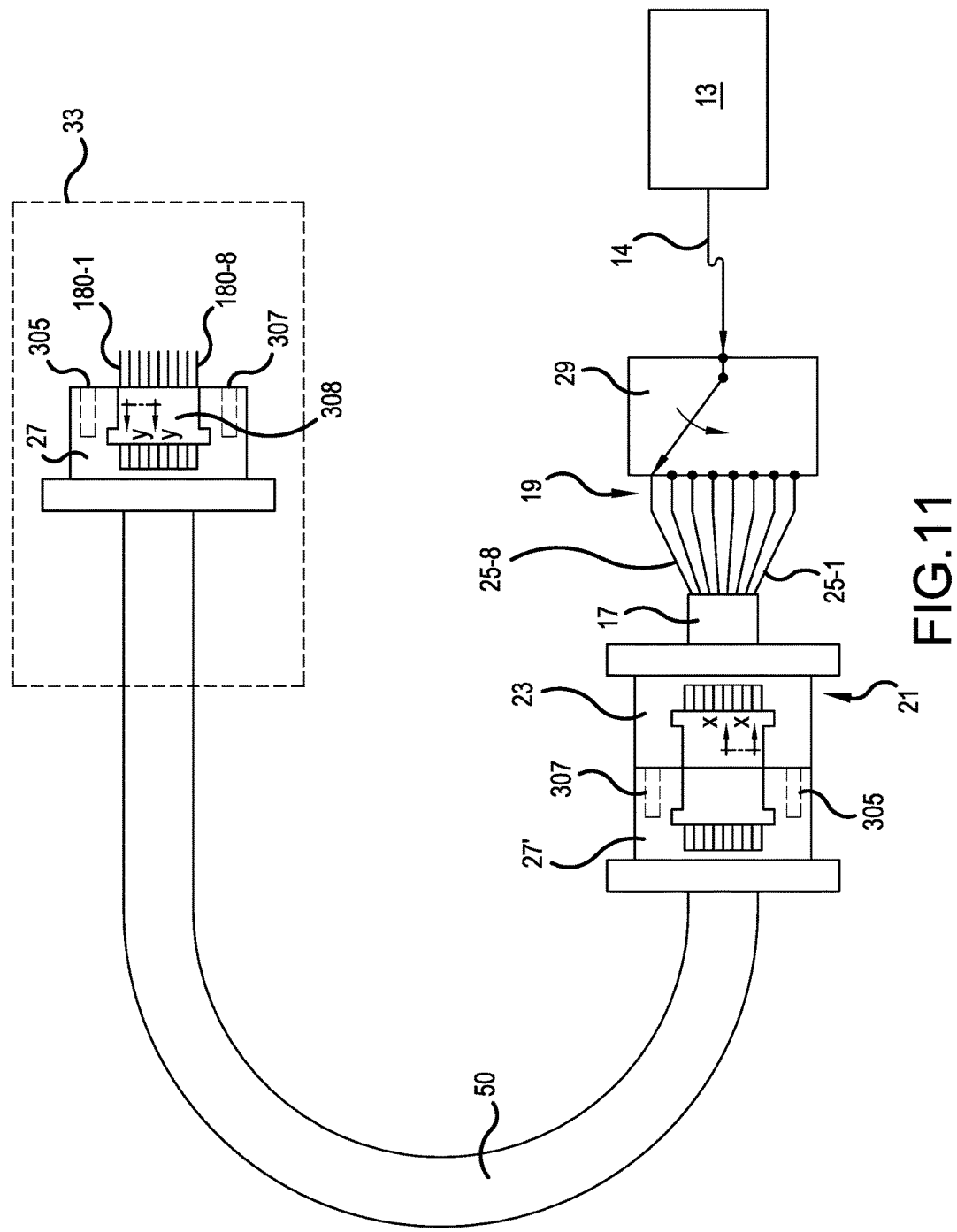
FIG. 11 is a block view illustrating the machine for affixing MCF within a ferrule of FIG. 5 configured to affix MCF within a ferrule by send light into a far end of the optical fiber cable.

FIG. 11 is a block diagram, illustrating that the machine of FIG. 5 may be used to launch light for affixing a target fiber 180-X within a target ferrule 27 from a far side of the fiber optic cable 50. In FIG. 11, the light guide 17 has been shortened and no longer reaches to workstation 33. Rather, the source ferrule 23 now mates to an assembled ferrule 27' on a first end of fiber optic cable 50. The target ferrule 27, having MCFs to be clocked, clamped and cured, is located at the remote, second end of the fiber optic cable 50. The target ferrule 27 is temporarily attached to the workstation 33 by a fixture.

Figure 6:
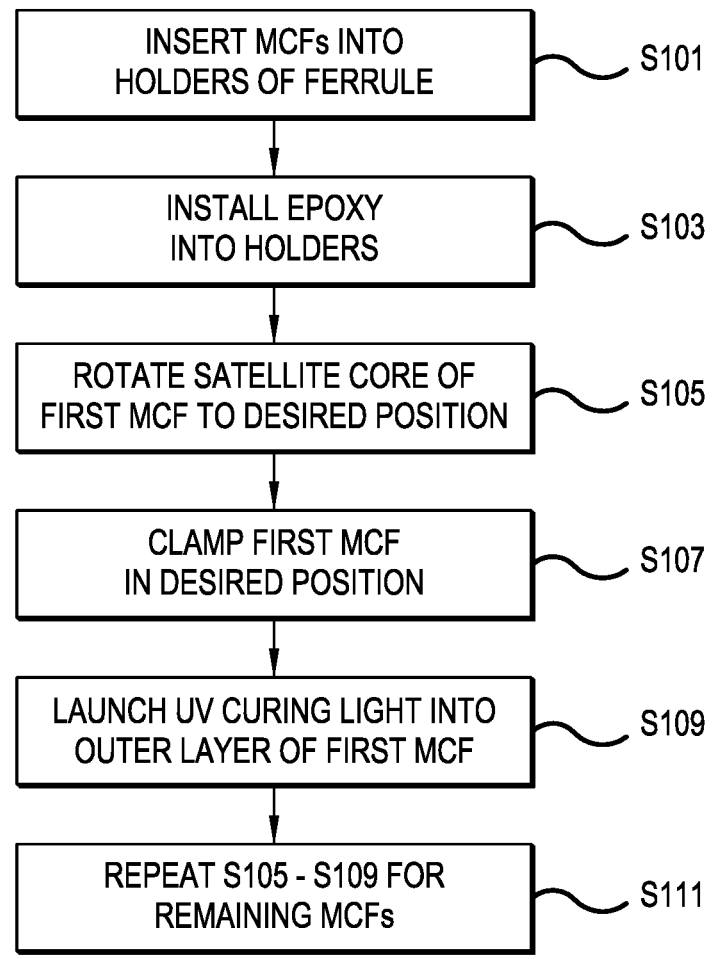
FIG. 6 is a flow chart illustrating a method of affixing MCF within a ferrule, in accordance with the present invention.
Figure 7:
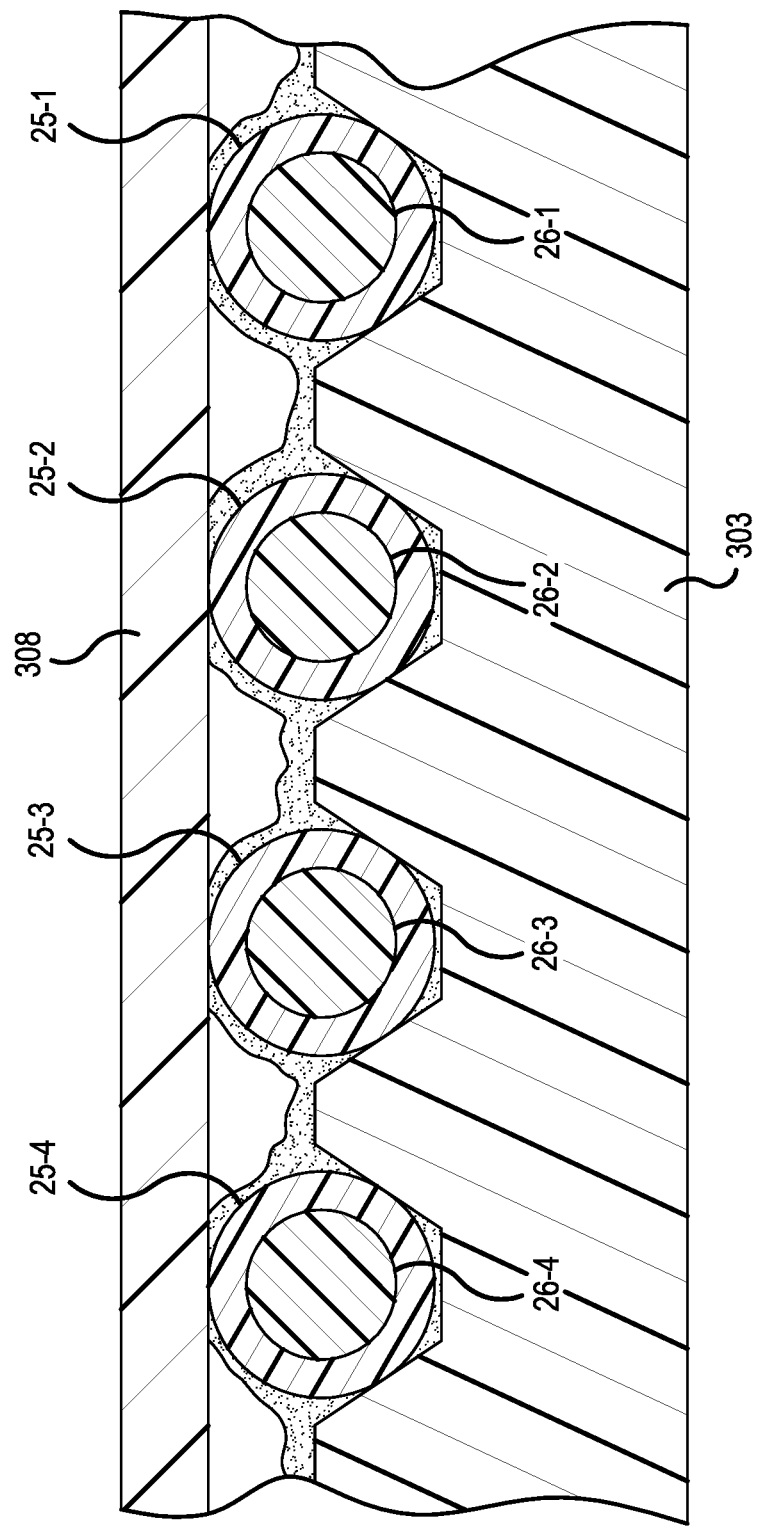
FIG. 7 is a cross sectional view of a source ferrule attached to the machine of FIG. 5, where the source ferrule is for selectively flooding UV light into target fibers of a target ferrule.

The technician may then perform the method steps of FIG. 6, as described above, without needing to attach and detach the source ferrule 23 to the target ferrule 27, as each target MCF 180 is clocked, clamped and cured. In other words, the source ferrule 23 remains attached to the remote ferrule 27' at the first end of the fiber optic cable 50. Once, the end face of the first target fiber 180-1 is clocked and clamped, at the target ferrule 27, the light source 13 is energized to send light through the first source fiber 25-1 into the first target fiber 180-1 at the remote ferrule 27' located at the first end of the fiber optic cable 50. The curing light will travel within the cladding layer 184 the distance of the fiber optic cable 50 until it reaches the epoxy 15 in the first holder 31-1 within the target ferrule 27. At that point, the curing light will leak outward and create cured epoxy 15' adjacent to the first target MCF 180-1.

The light will travel the length of the fiber optic cable 50 within the cladding layer 184 of the first target MCF 180-1 because all outer surfaces of the cladding layer 184 of the first target MCF 180-1, except those surfaces in contact with the light curable epoxy 15, are surrounded by an element having a lower index of refraction than the cladding layer 184. The light will leak from the cladding layer 184 into the light curable epoxy 15 because the light curable epoxy 15 has an index of refraction closer to the cladding layer 184 of the first target MCF 180-1 than the element surrounding the cladding layer 184 in other locations. In one embodiment, the element surrounding the cladding layer 184 is air, and the index of refraction of the light curable epoxy 15 is slightly greater than the index of refraction of the cladding layer 184.

Figure 12:
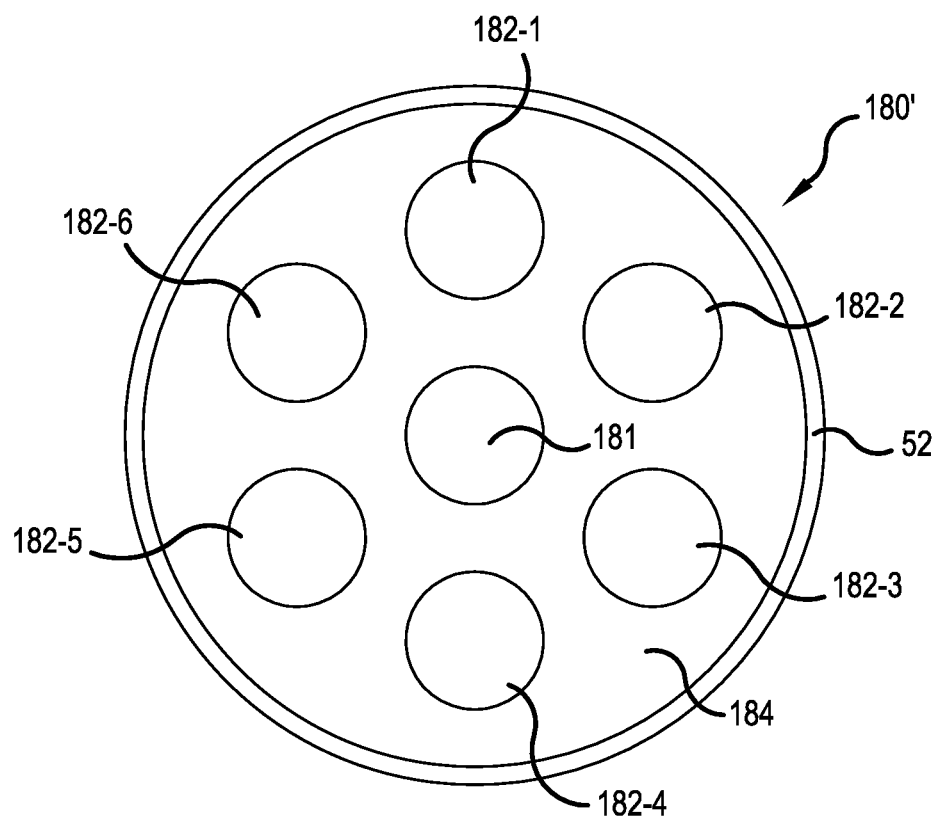
FIG. 12 is an end view of a MCF in accordance with a second embodiment of the present invention.

In a second embodiment, depicted in FIG. 12, the element surrounding the outer layer, e.g., the cladding layer 184, is a coating 52. The coating 52 is applied over the cladding layer 184 to create MCF 180'. This coating 52 is selected to have an index of refraction which is much lower than the index of refraction of the cladding layer 184 to ensure that the light traversing the cladding layer 184 is reflected at the inner surface of the coating 52 back into the cladding layer 184. Prior to inserting the MCF 180' into the holder 31-1, the coating 52 may be removed, chemically or mechanically, to expose the cladding layer 184 to the epoxy 15. Therefore, curing UV light within the cladding layer 184 will easily travel the distance of the fiber optic cable 50 without significant losses until it reaches the portion of the target MCF 180' where the coating 52 is absence and the outer surface of the cladding layer 184 is in contact with the light curable epoxy 15. At that point, light will escape from the cladding layer 184 into the light curable epoxy 15 and cause the MCF 180' to be fixed into position within the holder 31-1. The coating 52 may be a polymer or other type of thin film coating, applied over the cladding layer 184 for added protection of the cladding layer 184, with the polymer/thin film coating being selected to have a refractive index lower than the cladding layer 184 to promote reflection of the UV curing light propagating within the cladding layer 184.

Figure 13:
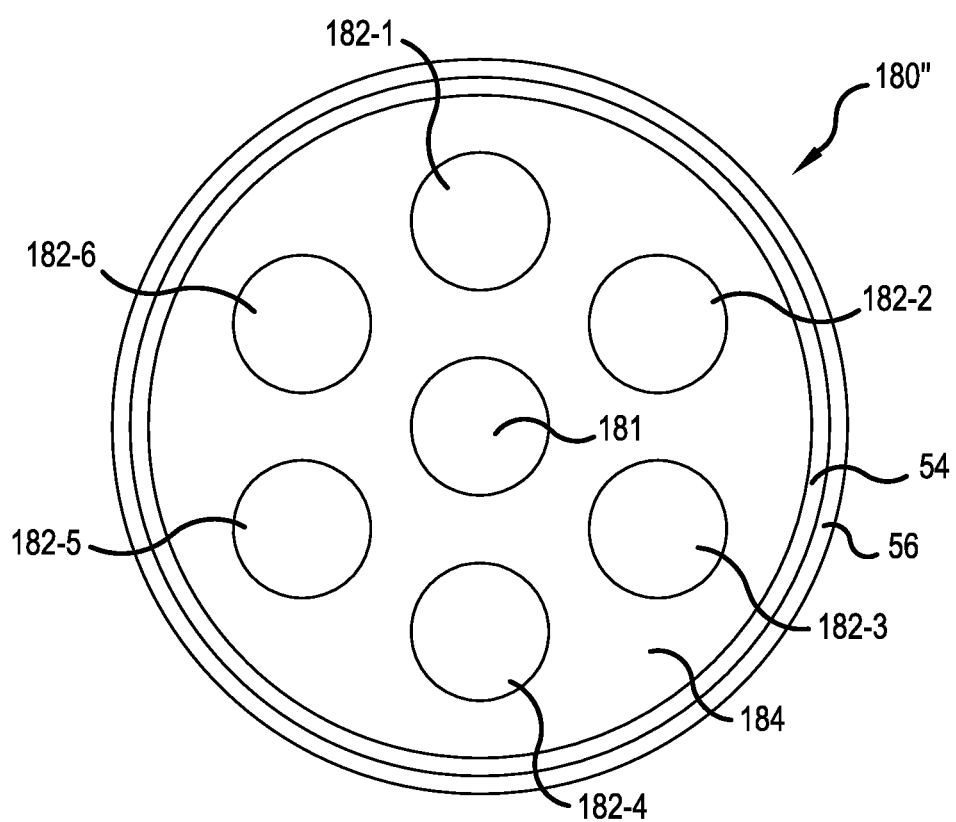
FIG. 13 is an end view of a MCF in accordance with a third embodiment of the present invention

FIG. 13 is an end view of a MCF 180" in accordance with a third embodiment of the present invention. MCF 180" demonstrates that the outer layer of the MCF 180", carrying the curing light, is not necessarily the cladding layer 184. As shown in the cross sectional view of FIG. 13, the cladding layer 184 is surrounded by a light carrying layer 54. The light carrying layer 54 is optimized to carry UV curing light. A coating 56 is applied over the light carrying layer 54. The coating 56 has an index of refraction which is optimized to keep the UV curing light from escaping outwardly away from the light carrying layer 54. Of course, such a coating 56 may also reside between the cladding layer 184 and the light carrying layer 54 to keep the UV curing light from escaping the light carrying layer 54 inwardly into the cladding layer 184.

Prior to inserting the MCF 180" into the holder 31-1, the coating 56 may be removed, chemically or mechanically, to expose the light carrying layer 54 to the epoxy 15. Therefore, curing UV light within the light carrying layer 54 will easily travel the distance of the fiber optic cable 50 without significant losses until it reaches the portion of the target MCF 180" where the coating 56 is absence and the outer surface of the light carrying layer 54 is in contact with the light curable epoxy 15. At that point, light will escape from the light carrying layer 54 into the light curable epoxy 15 and cause the MCF 180" to be fixed into position within the holder 31-1.

In one embodiment of the present invention, the light curable epoxy 15 can have a slightly higher index of refraction than the cladding layer 184. Epoxies, such as EPO-TEK OG142-112; OG142-87; and OG198-54, may be suitable, however other epoxies, including those with different indexes of refraction and those cured by light other than UV light should be considered within the purview of the present invention.

In another embodiment, the source fibers 25-X of FIG. 7 may have core 26-X with a large diameter, such as 125 um. Due to light spreading out at an angle as it leaves a core 26-X of the source fiber 25-X, it may also be possible to use a source fiber 25-X having a core 26-X with a slightly smaller diameter than the diameter of the cladding layer 184, since the spreading light will fully illuminate the cladding layer 184 of the target fiber 180.

Although the description has primarily focused on MCFs 180 in an array-type ferrule 303, it would also be possible to use the principals of the invention to secure a single MCF into a single fiber ferrule 203, and to secure one single core fiber into a single fiber ferrule 203 or multiple single core fibers into an array-type ferrule 303, if desired.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:
1. An optical fiber comprising:
plural cores, each for carrying a communication light signal from a first end of said optical fiber to a second end of said optical fiber;
a cladding layer surrounding said plural cores;
an additional layer surrounding said cladding layer, wherein said additional layer is a light carrying layer for carrying light from said first end of said optical fiber to said second end of said optical fiber, wherein said light carrying layer acts to carry curing light to cure an epoxy in contact with said light carrying layer; and
a first coating applied over said light carrying layer, wherein said first coating has an index of refraction to keep the curing light from escaping outwardly away from said light carrying layer, and wherein said first coating is removed from a portion of said light carrying layer in contact with the epoxy, so that the curing light will cure the epoxy in contact with said portion of said light carrying layer.

2. The optical fiber according to claim 1, further comprising:
a second coating applied between said cladding layer and said light carrying layer.

3. The optical fiber according to claim 2, wherein said second coating has an index of refraction to keep the curing light from escaping inwardly away from said light carrying layer into said cladding layer.

4. The optical fiber according to claim 1, wherein said plural cores are arranged as a central core surrounded by plural satellite cores, all being surrounded by said cladding layer.

5. The optical fiber according to claim 1, wherein said plural cores are arranged as a central core surrounded by six satellite cores, all being surrounded by said cladding layer.

6. An optical fiber comprising:
plural cores, each for carrying a communication light signal from a first end of said optical fiber to a second end of said optical fiber;
a cladding layer surrounding said plural cores; and
an additional layer surrounding said cladding layer, wherein said additional layer is a coating applied over said cladding layer, wherein said coating has an index of refraction which acts to keep curing light from escaping outwardly away from said cladding layer, and wherein said coating is removed from a portion of said cladding layer in contact with epoxy, so that the curing light will cure the epoxy in contact with said portion of said cladding layer.

7. The optical fiber according to claim 6, wherein said coating has an index of refraction which is much lower than an index of refraction of said cladding layer.

8. The optical fiber according to claim 6, wherein said coating is a polymer.

9. The optical fiber according to claim 6, wherein said plural cores are arranged as a central core surrounded by plural satellite cores, all being surrounded by said cladding layer.

10. An optical fiber comprising:
- at least one core for carrying a communication light signal from a first end of said optical fiber to a second end of said optical fiber;
- a cladding layer surrounding said at least one core;
- an additional layer surrounding said cladding layer, wherein said additional layer is a light carrying layer for carrying curing light from said first end of said optical fiber to said second end of said optical fiber to cure an epoxy in contact with said light carrying layer; and
- a first coating applied over said light carrying layer, wherein said first coating has an index of refraction to keep the curing light from escaping outwardly away from said light carrying layer, and wherein said first coating is removed from a portion of said light carrying layer in contact with the epoxy, so that the curing light will cure the epoxy in contact with said portion of said light carrying layer.

11. The optical fiber according to claim 10, further comprising:
- a second coating applied between said cladding layer and said light carrying layer.

12. The optical fiber according to claim 11, wherein said second coating has an index of refraction which is optimized to keep the curing light from escaping inwardly away from said light carrying layer into said cladding layer.

13. The optical fiber according to claim 1, wherein the curing light is a UV curing light, and said light carrying layer is optimized to carry the UV curing light.

14. The optical fiber according to claim 10, wherein the curing light is a UV curing light, and said light carrying layer is optimized to carry the UV curing light.

15. An optical fiber comprising:
- at least one core for carrying a communication light signal from a first end of said optical fiber to a second end of said optical fiber;
- a cladding layer surrounding said at least one core; and
- an additional layer surrounding said cladding layer, wherein said additional layer is a coating applied over said cladding layer, wherein said coating has an index of refraction which acts to keep curing light from escaping outwardly away from said cladding layer, and wherein said coating is removed from a portion of said cladding layer in contact with epoxy, so that the curing light will cure the epoxy in contact with said portion of said cladding layer.

16. The optical fiber according to claim 15, wherein said coating has an index of refraction which is much lower than an index of refraction of said cladding layer.

17. The optical fiber according to claim 15, wherein said coating is a polymer.

* * * * *